United States Patent
Bae et al.

(10) Patent No.: US 12,142,788 B2
(45) Date of Patent: Nov. 12, 2024

(54) POLYOLEFIN SEPARATOR FOR AN ELECTROCHEMICAL DEVICE AND ELECTROCHEMICAL DEVICE INCLUDING SAME

(71) Applicant: LG ENERGY SOLUTION, LTD., Seoul (KR)

(72) Inventors: Kyeong-Hui Bae, Daejeon (KR); So-Yeong Lee, Daejeon (KR); Won-Sik Bae, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/127,299

(22) Filed: Mar. 28, 2023

(65) Prior Publication Data

US 2023/0402710 A1    Dec. 14, 2023

(30) Foreign Application Priority Data

Jun. 14, 2022   (KR) .................. 10-2022-0072072
Feb. 14, 2023   (KR) .................. 10-2023-0019198

(51) Int. Cl.
    *H01M 50/417*    (2021.01)
    *H01M 50/457*    (2021.01)
    *H01M 50/489*    (2021.01)

(52) U.S. Cl.
    CPC ....... *H01M 50/417* (2021.01); *H01M 50/457* (2021.01); *H01M 50/489* (2021.01)

(58) Field of Classification Search
CPC . H01M 50/417; H01M 50/457; H01M 50/489
See application file for complete search history.

(56) References Cited

U.S. PATENT DOCUMENTS

| | | | |
|---|---|---|---|
| 2008/0057389 A1* | 3/2008 | Kono | H01M 50/449 156/244.11 |
| 2010/0136410 A1 | 6/2010 | Kawasoe et al. | |
| 2017/0263906 A1 | 9/2017 | Sugata et al. | |
| 2018/0301707 A1 | 10/2018 | Pan et al. | |
| 2019/0161564 A1 | 5/2019 | Kim et al. | |
| 2019/0252664 A1 | 8/2019 | Ishihara | |
| 2020/0024419 A1 | 1/2020 | Yamashita et al. | |

(Continued)

FOREIGN PATENT DOCUMENTS

| | | |
|---|---|---|
| CN | 101536216 A | 9/2009 |
| EP | 3 683 860 A1 | 7/2020 |

(Continued)

*Primary Examiner* — Daniel S Gatewood
(74) *Attorney, Agent, or Firm* — Birch, Stewart, Kolasch & Birch, LLP

(57) ABSTRACT

A polyolefin separator for an electrochemical device, the separator having a plurality of pores having an average pore size of 20 nm to 40 nm and a maximum pore size of 50 nm or less and including a polyolefin resin having a polydispersity index (PDI) of in a range of 2.5 to 4.2. The polyolefin separator may have a strain rate of 25% or less as measured when a tensile stress is applied at 60° C. at 15 MPa for 60 seconds, and the polyolefin separator may have a recovery time of 200 seconds or less to reach a recovery rate of 70% as measured after removing a tensile stress applied at 70° C. at 2 MPa for 180 seconds.

5 Claims, 2 Drawing Sheets

(56) References Cited

U.S. PATENT DOCUMENTS

| | | |
|---|---|---|
| 2020/0303704 A1 | 9/2020 | Adams et al. |
| 2021/0050575 A1 | 2/2021 | Park et al. |
| 2021/0194095 A1 | 6/2021 | Xiao et al. |
| 2021/0214535 A1 | 7/2021 | Yamashita et al. |

FOREIGN PATENT DOCUMENTS

| | | | | |
|---|---|---|---|---|
| EP | 3832770 A1 | * | 6/2021 | ......... B29C 48/0018 |
| EP | 3 950 795 A1 | | 2/2022 | |
| JP | 10-50286 A | | 2/1998 | |
| JP | 2000-63551 A | | 2/2000 | |
| JP | 2002-321323 A | | 11/2002 | |
| JP | 2015-120786 A | | 7/2015 | |
| JP | 7010621 B2 | | 1/2022 | |
| KR | 10-1340397 B1 | | 12/2013 | |
| KR | 10-2016-0002447 A | | 1/2016 | |
| KR | 10-2019-0118640 A | | 10/2019 | |
| KR | 10-2019-0130171 A | | 11/2019 | |
| KR | 10-2020-0085296 A | | 7/2020 | |
| KR | 10-2020-0106880 A | | 9/2020 | |
| KR | 10-2020-0108476 A | | 9/2020 | |
| KR | 10-2020-0142595 A | | 12/2020 | |
| KR | 10-2304973 B1 | | 9/2021 | |
| KR | 10-2021-0137000 A | | 11/2021 | |
| KR | 10-2021-0148119 A | | 12/2021 | |
| KR | 10-2344220 B1 | | 12/2021 | |
| KR | 10-2392398 B1 | | 4/2022 | |
| WO | WO 2015/194504 A1 | | 12/2015 | |
| WO | WO 2018/043331 A1 | | 3/2018 | |
| WO | WO 2019/054310 A1 | | 3/2019 | |
| WO | WO-2020195380 A1 | * | 10/2020 | |

* cited by examiner

[Fig. 1]
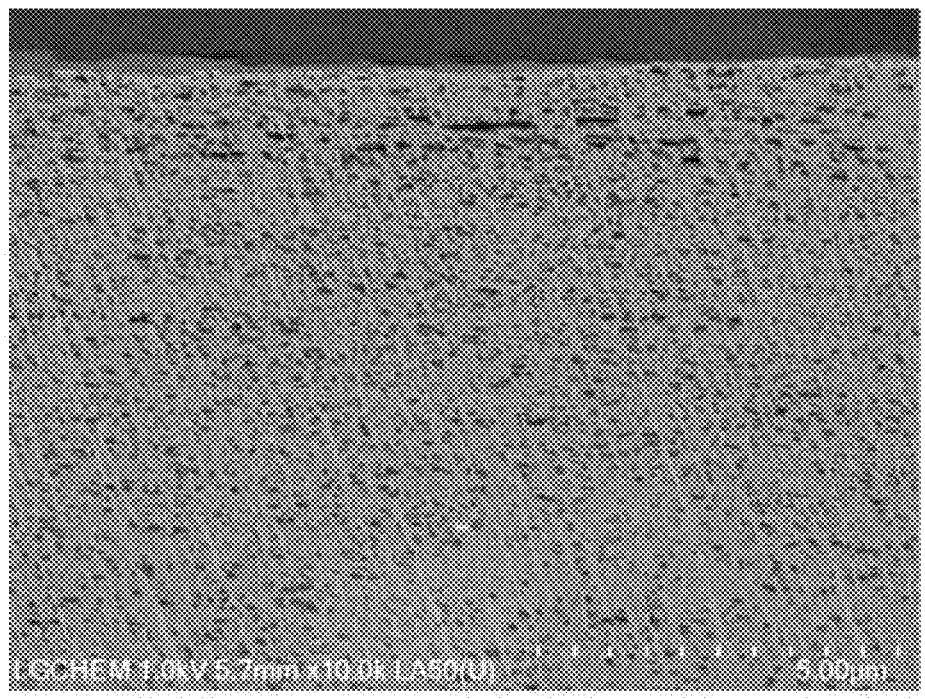

[Fig. 2]
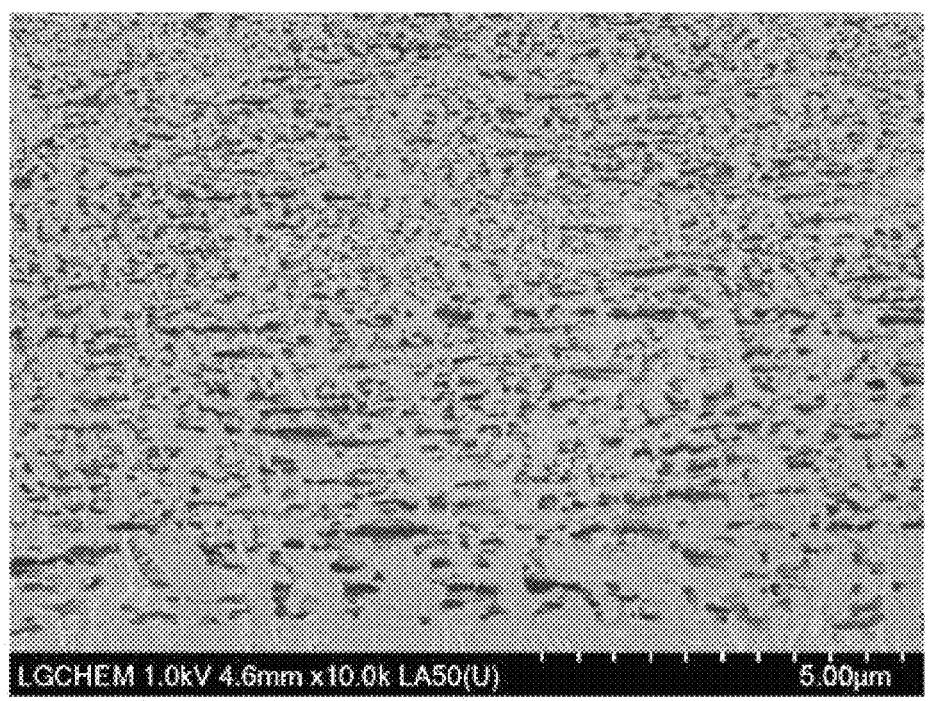

POLYOLEFIN SEPARATOR FOR AN ELECTROCHEMICAL DEVICE AND ELECTROCHEMICAL DEVICE INCLUDING SAME

CROSS REFERENCE TO RELATED APPLICATION

The present application claims priority to Korean Patent Applications No. 10-2022-0072072, filed Jun. 14, 2022, and No. 10-2023-0019198, filed Feb. 14, 2023, respectively, the entire contents of which is incorporated herein for all purposes by these references.

BACKGROUND OF THE INVENTION

1. Field of the Invention

The present disclosure relates to a separator for an electrochemical device based on a polyolefin resin and to an electrochemical device including the same.

2. Description of the Related Art

A porous film substrate based on a polymer resin such as polyolefin is used as a separator for an electrochemical device such as a secondary battery. In general, an electrode assembly is manufactured through a lamination process in which a separator and an electrode are bonded by heat and pressure. The higher the heat and pressure applied in this process, the higher the binding force between the electrode and the separator. Recently, as the processing speed is increased to improve productivity, the time to apply heat to a separator is decreased, and thus, a binding force is to be ensured by increasing pressure to ensure the binding force, but the separator may be deformed by such increased pressure. In addition, during the lamination process, the thickness of the polymer film substrate is greatly reduced, and the damage to the pores is increased, so not only the performance of the battery but also the dielectric breakdown voltage of the separator is reduced, resulting in hi-pot defects and low voltage defects. Therefore, it is necessary to develop a porous polymer film substrate for a separator that has little deformation, even under high-pressure lamination conditions.

SUMMARY OF THE INVENTION

An objective of the present disclosure is to provide a polyolefin separator for an electrochemical device having a low thickness change rate or strain and a high dielectric breakdown voltage during a lamination process for manufacturing an electrode assembly by improving compression resistance.

Another objective of the present disclosure is to provide an electrochemical device including a separator having the above-described characteristics.

It will be readily apparent that the objectives and advantages of the present disclosure may be realized by means or methods and combinations thereof recited in the claims.

One aspect of the present disclosure provides a separator for an electrochemical device including a polyolefin resin, the separator having a plurality of pores, in which the polyolefin resin has a polydispersity index (PDI) of 2.5 to 4.2, the average pore diameter of the pores is in a range of 20 nm to 40 nm, and the maximum pore size is 50 nm or less.

The polyolefin separator for an electrochemical device may have a strain rate of 25% or less as measured when a tensile stress is applied at 60° C. at 15 MPa for 60 seconds, and the polyolefin separator may have a recovery time of 200 seconds or less to reach a recovery rate of 70% as measured after removing a tensile stress applied at 70° C. at 2 MPa for 180 seconds.

In another aspect of the present disclosure, the polyolefin resin has a polydispersity index (PDI) of 2.5 to 4.0, the average pore diameter of the pores is in a range of 20 nm to 39 nm, and the maximum pore size is 48 nm or less.

The polyolefin separator for an electrochemical device may have a strain rate of 23% or less as measured when a tensile stress is applied at 60° C. at 15 MPa for 60 seconds, and the polyolefin separator may have a recovery time of 190 seconds or less to reach a recovery rate of 70% as measured after removing a tensile stress applied at 70° C. at 2 MPa for 180 seconds.

In another aspect of the present disclosure, the polyolefin resin has a polydispersity index (PDI) of 2.6 to 3.9, and the average pore diameter of the pores is in a range of 21 nm to 38 nm, and the maximum pore size is 46 nm or less.

The polyolefin separator for an electrochemical device may have a strain rate of 21% or less as measured when a tensile stress is applied at 60° C. at 15 MPa for 60 seconds, and the polyolefin separator may have a recovery time of 180 seconds or less to reach a recovery rate of 70% as measured after removing a tensile stress is applied at 70° C. at 2 MPa for 180 seconds.

In another aspect of the present disclosure, the average pore diameter of the pores is in a range of 22.2 nm to 36.1 nm.

The polyolefin separator for an electrochemical device may have a strain rate of 20.1% or less when a tensile stress is applied at 60° C. at 15 MPa for 60 seconds, and the polyolefin separator may have a recovery time of 178 seconds or less to reach a recovery rate of 70% as measured after removing a tensile stress applied at 70° C. at 2 MPa for 180 seconds.

In another aspect of the present disclosure, the polyolefin resin has a weight-average molecular weight of 500,000 to 1,500,000.

In another aspect of the present disclosure, the polyolefin separator includes a core part including a mixture of polyethylene and polypropylene, and a polyethylene skin part laminated on both sides of the core part.

In another aspect of the present disclosure, the polyolefin separator is manufactured by a wet manufacturing method in which a pore-forming agent is extracted to form pores.

Another aspect of the present disclosure provides an electrochemical device having an electrode assembly including a cathode, an anode, and a separator interposed between the cathode and the anode, in which the separator is a polyolefin separator as described herein.

In another aspect of the present disclosure, the electrochemical device is a lithium secondary battery.

The polyolefin separator, according to this disclosure, may improve the compressive resistance of the separator by controlling the polydispersibility index of the polyolefin resin and the average pore size of the pores formed in the separator, and the maximum pore size within a predetermined range and by suppressing the strain and recovery rate of the separator to a predetermined value or less under a predetermined condition.

Accordingly, the thickness reduction rate of the separator due to the pressure applied during the lamination process for manufacturing the electrode assembly may be low. Accordingly, the separator of the present disclosure may not lower the dielectric breakdown voltage and may have high insulation properties. In addition, even if high pressure is applied during the lamination process, the damage to the separator may be small, and the processing speed can be increased, thereby improving processability.

BRIEF DESCRIPTION OF THE DRAWINGS

The accompanying drawings illustrate preferred embodiments of the disclosure, and together with the detailed description, explain the principles of the disclosure, but the scope of the disclosure is not limited thereto. On the other hand, the shape, size, scale, or ratio of elements in the drawings included in this specification may be exaggerated to emphasize a clearer description.

FIG. 1 shows an SEM image of a cross-section of the separator of Example 1; and

FIG. 2 shows an SEM image of a cross-section of the separator of Comparative Example 1.

DESCRIPTION OF THE PREFERRED EMBODIMENTS

Hereinafter, the present disclosure will be described in detail. Prior to this, terms or words used in the specification and claims should not be construed as conventional or dictionary meanings, but should be construed as meanings and concepts conforming to the technical idea of this invention based on the principle that the inventor can appropriately define the concept of terms to describe his invention in the best way. Therefore, since the configurations described in the embodiments described herein are only the most preferred embodiments of the present disclosure and do not represent all the technical ideas of the present disclosure, it should be understood that there may be various equivalents and modifications that may replace them at the time of the present application.

Throughout this specification, when a part "includes" a certain component, it means that other components may be further included, rather than excluding other components, unless otherwise stated.

In the present specification, the characteristic of having pores means that a gaseous and/or liquid fluid can pass from one side of the object to the other side by a structure in which the object includes a plurality of pores, where the pores are interconnected.

The present disclosure relates to a separator for an electrochemical device that can be applied to the separator itself or one component of the separator. Accordingly, in the separator of the present disclosure, if necessary, another layer may be additionally present on at least one surface of the separator substrate in terms of material or function. In one embodiment of the present disclosure, the separator may have an organic/inorganic composite coating layer including inorganic particles and/or a binder resin on at least one side or both sides of the porous substrate.

In addition, the present disclosure relates to an electrochemical device including the separator. In the present disclosure, the electrochemical device is a device that converts chemical energy into electrical energy by an electrochemical reaction and is a concept encompassing a primary battery and a secondary battery. In the present specification, the secondary battery is capable of charging and discharging and means a lithium secondary battery, a nickel-cadmium battery, a nickel-hydrogen battery, and the like. The lithium secondary battery uses lithium ions as an ion conductor and uses a non-aqueous electrolyte secondary battery including a liquid electrolyte, an all-solid battery including a solid electrolyte, a lithium polymer battery including a polymer gel electrolyte, and a lithium metal battery using lithium metal as an anode and the like, but is not limited thereto.

In the present specification, the separator has a porous property, including a plurality of pores, and serves as an ion-conducting barrier to pass ions while blocking electrical contact between the cathode and the anode in an electrochemical device.

Hereinafter, the polyolefin separator for an electrochemical device, according to the present disclosure, will be described in detail.

The polyolefin separator for an electrochemical device of the present disclosure is a separator for an electrochemical device having a plurality of pores and including a polyolefin resin, in which the polyolefin resin has a polydispersity index (PDI) of 2.5 to 4.2, and the average pore diameter of the pores is in a range of 20 nm to 40 nm, and the maximum pore size is 50 nm or less.

The polyolefin separator for an electrochemical device may have a strain rate of 25% or less when a tensile stress is applied at 60° C. at 15 MPa for 60 seconds, and the polyolefin separator may have a recovery time of 200 seconds or less to reach a recovery rate of 70% as measured after removing a tensile stress applied at 70° C. at 2 MPa for 180 seconds. The specific parameters for the measurement of strain rate and recovery rate are described in greater detail below.

In the present disclosure, the polyolefin separator is manufactured using a polyolefin resin as a base resin. Examples of the polyolefin-containing resin may include polyethylene, polypropylene, polypentene, and the like, and one or more of these resins. The porous separator manufactured using such a polyolefin resin as a base resin, that is, having a plurality of pores is advantageous in terms of providing a shutdown function at an appropriate temperature. In particular, when polyethylene and polypropylene are included as polyolefin resins at the same time, physical properties such as shutdown characteristics and mechanical strength can be improved at the same time.

In general, as the molecular weight of the resin is higher, the weight average molecular weight of the polyolefin resin may be 500,000 to 1,500,000, which is higher than that of the related art in terms of advantageous compressibility. When forming a separator using a mixture of different types of polyolefin resins or a multilayer structure including different types of polyolefin resins, the weight-average molecular weight of the polyolefin resin is calculated by adding the weight-average molecular weight according to the content ratio of each polyolefin resin.

In addition to the above-described polyolefin base resin, other resin components may be further mixed as needed, and for example, filler particles may be included in addition to the resin component. Filler particles may be introduced for the purpose of a pressure barrier in order not to excessively decrease the thickness, pore size, and porosity of the separator substrate with respect to a high pressure applied in a lamination process to be described later. Filler particles may include an organic filler or an inorganic filler having a predetermined particle size and are not limited to a specific component as long as an inorganic filler has a strength greater than or equal to the polyolefin resin.

In the present disclosure, the polydispersity index (PDI) of the polyolefin resin is in a range of 2.5 to 4.2, the average diameter of the pores is in a range of 20 nm to 40 nm, and the maximum size of the pores is 50 nm or less. That is, in the present disclosure, the polyolefin resin has a low polydispersity index, and the average diameter of the pores and the maximum size of the pores are small. The compression resistance is improved when these ranges are simultaneously satisfied. When the polydispersity index is less than 2.5, there may be a problem in that processability is lowered, and the uniformity of the film is deteriorated, and when the polydispersity index exceeds 4.2, there may be a problem in that compression resistance is lowered. In addition, when the average diameter of the pores is less than 20 nm, the air permeability may be lowered, and there may be a problem that by-products clog the small pores during charging and discharging of the battery. When the average diameter of the pores is greater than 40 nm, there may be a problem in that the thickness of the separator is not uniform, the thickness deformation is caused, and the compression resistance is decreased due to local thickness deformation. In addition, when the maximum size of the pores exceeds 50 nm, there may also be a problem in that the compression resistance is lowered.

The pore size may be calculated from the pore size distribution measured using a capillary flow porometer method. For example, at first, after wetting the separator to be measured with a wetting agent such as Galwick solution, the air pressure on one side of the substrate is gradually increased. At this time, when the applied air pressure is greater than the capillary attraction of the wetting agent existing in the pores, the wetting agent blocking the pores is pushed out, and the pore size and distribution are measured through the pressure and flow rate at the moment of pushed out. The average pore size (size) and the maximum pore size can be confirmed from this.

In one aspect, the polydispersity index (PDI) of the polyolefin resin may be 2.5 to 4.0, more specifically, 2.6 to 3.9. In addition, the average diameter of the pores may be 20 nm to 39 nm, more specifically, may be 21 nm to 38 nm, and most specifically, may be 22.2 nm to 36.1 nm. In addition, the maximum size of the pores may be 48 nm or less, and more specifically, 46 nm or less.

Also, in an aspect of the present disclosure, the polyolefin separator for an electrochemical device may have a strain rate of 25% or less as measured when a tensile stress is applied at 60° C. at 15 MPa for 60 seconds, and at the same time, when a tensile stress is applied at 70° C. at 2 MPa for 180 seconds and then removed, the time being taken until the recovery rate reaches 70% is 200 seconds or less.

When the strain rate under the above conditions exceeds 25% or the time being taken until the recovery rate reaches 70% exceeds 200 seconds, the compression resistance after the lamination process with the electrode is deteriorated.

In one aspect, the polyolefin separator for an electrochemical device may have a strain rate of 23% or less when a tensile stress is applied at 60° C. at 15 MPa for 60 seconds, and the polyolefin separator may have a recovery time of 190 seconds or less to reach a recovery rate of 70% as measured after removing a tensile stress applied at 70° C. at 2 MPa for 180 seconds.

More specifically, when tensile stress is applied at 60° C. at 15 MPa for 60 seconds, the strain rate is less than 21%, and when the tensile stress is applied at 70° C. at 2 MPa for 180 seconds and then removed, the recovery time being taken until a recovery rate reaches 70% may be less than 180 seconds.

Most specifically, when tensile stress is applied at 60° C. at 15 MPa for 60 seconds, the strain rate may be 20.1% or less, and when the tensile stress is applied at 70° C. at 2 MPa for 180 seconds and then removed, the time being taken until a recovery rate reaches 70% is 178 seconds or less.

The above-described polyolefin separator may be manufactured as follows but is not limited thereto.

In one embodiment of the present disclosure, the separator may be manufactured using a wet method, by mixing a polyolefin resin with diluents at high temperature to form a single phase, phase-separating the polymer material and the diluents during a cooling process, extracting diluents to form pores and then stretching and performing a heat fixation treatment. In particular, the polyolefin separator may include a core part including a mixture of polyethylene and polypropylene, and a polyethylene skin part laminated on both sides of the core part but is not limited thereto.

The average diameter of the pores of the separator and the maximum diameter of the pores may be easily manufactured to fit the scope of the present disclosure by controlling the mixing ratio of the diluents, the elongation ratio, and the heat fixation treatment temperature.

In the present disclosure, the polyolefin separator substrate prepared by the above method may have a thickness in the range of 5 μm to 30 μm.

Meanwhile, in one embodiment of the present disclosure, the separator may further include an organic/inorganic composite coating layer on at least one surface of the polyolefin separator substrate.

The organic/inorganic composite coating layer may include a binder resin and inorganic particles and has a porous property. In one embodiment of the present disclosure, the binder resin and inorganic particles in the organic/inorganic composite coating layer may be present in a weight ratio of 1:99 to 30:70 (binder resin to inorganic particles). The weight ratio may be appropriately adjusted within the above range, for example, when the sum of the binder resin and the inorganic particles is 100% by weight, the binder resin may be 1% by weight or more, 5% by weight or more, or 10% by or more, and the inorganic particles may be 80% by weight or more, 85% by weight or more, 90% by weight or more, or 95% by weight or more.

The organic/inorganic composite coating layer may be formed by binding inorganic particles with a binder resin and integrating them within the layer. The pores inside the organic/inorganic composite coating layer may be formed by an interstitial volume, which is an empty space between the inorganic particles.

In one embodiment of the present disclosure, the porosity of the organic/inorganic composite coating layer may be 30 vol % to 70 vol %. When the porosity is 70 vol % or less, it is suitable to ensure dynamic characteristics that may endure a press process that bonds to an electrode and to ensure binding force because a surface aperture ratio is not too high. On the other hand, when the porosity is 30 vol % or more, it is advantageous in terms of ion permeability.

The thickness of the organic/inorganic composite coating layer may be formed to be 1 μm to 20 μm with respect to any one side of the separator substrate but is not particularly limited thereto. The thickness may be adjusted within an appropriate range by those skilled in the art in terms of heat resistance or electrical resistance.

In the present disclosure, non-limiting examples of binder resins that can be used for the organic/inorganic composite coating layer may include at least one polymer resin selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethylpullulan, cyanoethylpolyvinylalcohol, cyanoethylcellulose, cyanoethyl sucrose, pullulan, and carboxyl methyl cellulose, or a mixture of two or more thereof. However, the present disclosure is not particularly limited thereto.

In a specific embodiment of the present disclosure, the inorganic particles that can be used in the organic/inorganic composite coating layer are not particularly limited as long as they are electrochemically stable. That is, the inorganic particles that can be used in the present disclosure are not particularly limited as long as oxidation and/or reduction reactions do not occur in the operating voltage range of the applied electrochemical device (e.g., 0 to 5 V based on Li/Li$^+$).

Non-limiting examples of the inorganic particles include $BaTiO_3$, $Pb(Zr,Ti)O_3(PZT)$, $b_{1-x}La_xZr_{1-y}Ti_yO_3$ (PLZT, 0<x<1, 0<y<1), $Pb(Mg_{1/3}Nb_{2/3}))O_3$—$PbTiO_3$(PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, aluminum peroxide, tin-zinc hydroxide ($ZnSn(OH)_6$), tin-zinc oxide ($Zn_2SnO_4$, $ZnSnO_3$), antimony trioxide ($Sb_2O_3$), antimony tetraoxide ($Sb_2O_4$), antimony pentoxide ($Sb_2O_5$), etc., and the inorganic particles may include one or two or more of them.

In addition, the average diameter (D50) of the inorganic particles is not particularly limited but is preferably in the range of 0.3 μm to 1 μm in order to form a coating layer having a uniform thickness and an appropriate porosity. When the average diameter of the inorganic particles is less than 0.3 μm, the dispersibility of the inorganic particles in the slurry prepared for preparing the organic/inorganic composite coating layer may be reduced, and when the average diameter of the inorganic particles is more than 1 μm, the thickness of the formed coating layer may increase.

In one embodiment of the present disclosure, the method of forming the organic/inorganic composite coating layer is, for example, as follows. First, a polymer solution is prepared by dissolving a binder resin in an appropriate organic solvent. It is preferable that the solvent may have a solubility parameter similar to that of the binder polymer to be used and a boiling point that is low. This is to facilitate uniform mixing and subsequent solvent removal. Non-limiting examples of the solvent that can be used may include acetone, tetrahydrofuran, methylene chloride, chloroform, dimethylformamide, N-methyl-2-pyrrolidone (NMP), cyclohexane, water, or a mixture thereof.

Thereafter, inorganic particles are added and dispersed in the prepared polymer solution. In the present disclosure, the content ratio of the inorganic particles and the binder is as described above and is appropriately adjusted in consideration of the thickness, pore size, and porosity of the organic/inorganic composite coating layer of the present disclosure that is finally manufactured.

Next, the inorganic particle slurry prepared above is applied to at least one side of the prepared separator substrate and dried. A method of applying the slurry to the surface of the separator substrate is not particularly limited to any one method, and a conventional method known in the art may be used. For example, various methods such as dip coating, die coating, roll coating, comma coating, or a mixture thereof may be used.

In the drying process, temperature and time conditions may be appropriately set to minimize the occurrence of surface defects of the organic/inorganic composite coating layer. The drying may be performed by a drying aid device such as a drying oven or hot air within an appropriate range.

When the separator includes an organic/inorganic composite porous layer, damage due to the pressing of inorganic particles on the surface of the separator substrate facing the organic/inorganic composite porous layer during the lamination process may be reduced.

The separator prepared by the above-described method is interposed between the anode and the cathode and is manufactured as an electrode assembly by a lamination process in which heat and/or pressure are applied to bind the separator. In one embodiment of the present disclosure, the lamination process may be performed by a roll press device including a pair of pressure rollers. That is, an anode, a separator, and a cathode are sequentially laminated and put between the pressure rollers to achieve interlayer bonding. In this case, the lamination process may be performed by a method of hot pressing.

On the other hand, the present disclosure provides an electrochemical device including the separator, in particular, a lithium secondary battery. The battery includes an anode, a cathode, and a separator interposed between the anode and the cathode, and the separator includes a separator substrate having the characteristics as described above.

The cathode includes a cathode current collector and a cathode active material layer including a cathode active material, a conductive material, and a binder resin on at least one surface of the current collector. The cathode active material may include one or two or more of a mixture among layered compounds such as lithium manganese oxide ($LiMn_2O_4$, $LiMnO_2$, etc.), lithium cobalt oxide ($LiCoO_2$), lithium nickel oxide ($LiNiO_2$), or a compound substituted with one or more transition metals; lithium manganese oxides of the formula $Li_{1+x}Mn_{2-x}O_4$ (where x is 0 to 0.33), $LiMnO_3$, $LiMn_2O_3$, $LiMnO_2$, and the like; lithium copper oxide ($Li_2CuO_2$); vanadium oxides such as $LiV_3O_8$, $LiV_3O_4$, $V_2O_5$, and $Cu_2V_2O_7$; Ni site-type lithium nickel oxide represented by the formula $LiNi_{1-x}MxO_2$ (where M=Co, Mn, Al, Cu, Fe, Mg, B, or Ga, and x=0.01 to 0.3); lithium manganese composite oxides represented by the formula $LiMn_{1-x}MxO_2$ (where M=Co, Ni, Fe, Cr, Zn, or Ta and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; and $Fe_2(MoO_4)_3$.

In the present disclosure, the anode includes an anode current collector and an anode active material layer including an anode active material, a conductive material, and a binder resin on at least one surface of the current collector. The anode may include at least one component or two or more of a mixture as an anode active material selected from the group consisting of carbons such as lithium metal oxide, non-graphitized carbon, and graphite-containing carbon; metal composite oxides such as $LixFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements of groups 1, 2, and 3 of the periodic table, halogen; 0<x≤1; 1≤y≤3; 1≤z≤8); lithium metal; lithium alloy; silicon-containing alloys; tin-containing alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-containing materials; and titanium oxides.

In one specific embodiment of the present disclosure, the conductive material may be, for example, any one selected from the group consisting of graphite, carbon black, carbon fiber, or metal fiber, metal powder, conductive whisker, conductive metal oxide, activated carbon, and polyphenylene derivatives, or a mixture of two or more conductive materials. More specifically, the conductive material may be one selected from the group consisting of natural graphite, artificial graphite, super-p, acetylene black, Ketjen black, channel black, furnace black, lamp black, summer black, denka black, aluminum powder, nickel powder, zinc oxide, potassium titanate, and titanium oxide, or a mixture of two or more of these conductive materials.

The current collector is not particularly limited as long as it has high conductivity without causing a chemical change in the battery, and for example, stainless steel, copper, aluminum, nickel, titanium, calcined carbon, or surface treatment material of aluminum or stainless steel with carbon, nickel, titanium, silver, etc., may be used.

As the binder resin, a polymer commonly used for electrodes in the art may be used. Non-limiting examples of such binder resins include polyvinylidene fluoride-co-hexafluoropropylene, polyvinylidene fluoride-co-trichlorethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose and the like, but are not limited thereto.

In the present disclosure, a cathode slurry may comprise a dispersing agent for manufacturing the cathode active material layer, and the dispersing agent may be a pyrrolidone-containing compound. Specifically, the dispersing agent may be N-methylpyrrolidone (ADC-01, LG Chem, Co., Ltd.).

In the present disclosure, the content of the dispersing agent in the cathode slurry for manufacturing the cathode active material layer may be 0 part or more and 0.5 parts or less. Specifically, the content of the dispersing agent in the cathode slurry for manufacturing the cathode active material layer may be 0.05 parts and more and 0.4 parts or less.

In the present disclosure, an anode slurry may comprise a dispersing agent for manufacturing the anode active material layer, and the dispersing agent may be a polypyrrolidone-containing compound. Specifically, the dispersing agent may be polyvinylpyrrolidone (ADC-01, Japan Junsei, Co., Ltd.).

In the present disclosure, the content of the dispersing agent in the anode slurry for manufacturing the anode active material layer may be more than 0 part or more and 0.5 parts or less. Specifically, the content of the dispersing agent in the anode slurry for manufacturing the anode active material layer may be 0.05 parts or more and 0.4 parts or less.

The electrode assembly prepared as described above may be loaded in an appropriate case, and electrolyte may be injected to manufacture a battery.

In the present disclosure, the electrolyte solution is a salt having the same structure as $A^+B^-$, and $A^+$ includes ions formed of alkali metal cations such as $Li^+$, $Na^+$, $K^+$, or a combination thereof, or $B^-$ includes $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. In the electrolyte, the salt may be dissolved or dissociated in an organic solvent or an organic solvent consisting of a mixture thereof including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), and gamma butyrolactone (γ-butyrolactone) but is not limited thereto.

In addition, the present disclosure provides a battery module including a battery including the electrode assembly as a unit cell, a battery pack including the battery module, and a device including the battery pack as a power source. Specific examples of the device include a power tool powered by a battery motor; electric vehicles including electric vehicles (EVs), hybrid electric vehicles (HEVs), plug-in hybrid electric vehicles (PHEVs), and the like; electric two-wheeled vehicles including electric bicycles (E-bikes) and electric scooters (E-scooter); electric golf carts; and a power storage system, but is not limited thereto.

Hereinafter, examples will be given to describe the present disclosure in detail. However, the embodiments according to the present disclosure may be modified in various other forms, and the scope of the present disclosure should not be construed as being limited to the embodiments described below. The embodiments of the present disclosure are provided to more completely explain the present disclosure to those of ordinary skilled in the art.

Example 1

A polyolefin separator substrate was prepared by co-extruding a resin obtained by mixing polyethylene (900,000 weight-average molecular weight) and polypropylene (900,000 weight-average molecular weight) in a weight ratio of 93:7 as a core part, and a polyethylene (900,000 weight-average molecular weight) resin is placed on both sides of the core part as a skin part. At this time, the stretching temperature was adjusted to 105° C. and the heat setting temperature 130° C. to prepare a polyolefin separator substrate (total thickness of about 9 μm, core thickness: 7 μm, total thickness of both skin part 2 μm) by a wet method. The PDI of the resin used to prepare the separator was calculated according to Formula 1 below.

Table 1 below shows PDI of the prepared polyolefin separator, the average diameter of pores, maximum pore size, strain rate when tensile stress is applied at 60° C. at 15 MPa for 60 seconds (referred to as recovery strain rate), and the time (referred to as recovery time) until reaching a recovery rate of 70% when a tensile stress is applied at 70° C. at 2 MPa for 180 seconds and then removed.

Example 2

A separator was prepared in the same manner as in Example 1, except that the stretching temperature was adjusted to 120° C. and the heat setting temperature to 115° C.

Example 3

A separator was prepared in the same manner as in Example 1, except that the heat setting temperature was adjusted to 115° C.

Comparative Example 1

A separator was prepared in the same manner as in Example 1, except that a resin in which polyethylene (weight average molecular weight 900,000) and polypropylene (weight average molecular weight 350,000) were mixed in a weight ratio of 97:3 was used as the skin part, and the stretching temperature was adjusted to 120° C.

Comparative Example 2

A separator was prepared in the same manner as in Example 1, except that a resin in which polyethylene (weight-average molecular weight 900,000) and polypropylene (weight-average molecular weight 350,000) were mixed in a weight ratio of 97:3 was used as the skin part, and the stretching temperature was adjusted to 115° C.

Comparative Example 3

A separator was prepared in the same manner as in Example 1, except that a resin in which polyethylene (weight-average molecular weight 900,000) and polypropylene (weight-average molecular weight 350,000) were mixed in a weight ratio of 97:3 was used as the skin part.

Comparative Example 4

A separator was prepared in the same manner as in Example 1, except that a resin in which polyethylene (weight-average molecular weight 900,000) and polypropylene (weight-average molecular weight 350,000) were mixed in a weight ratio of 97:3 was used as the skin part, and the stretching temperature was adjusted to 120° C. and the heat setting temperature to 115° C.

[PDI Measurement]

PDI=(weight-average molecular weight)/(number-average molecular weight)  (Formula 1)

In this case, the weight-average molecular weight and the number-average molecular weight values were obtained by cutting the separator into a predetermined size and analyzing the gel permeation chromatography (GPC).

[Measurement of Average Pore Size and Maximum Pore Size]

It was measured according to the pore size distribution using a capillary flow porometer (CFP method).

[Measurement of Strain when Tensile Stress is Applied at 60° C. at 15 MPa for 60 Seconds]

The strain rate was measured by applying strain at 60° C. at 15 MPa for 60 seconds through dynamic mechanical analysis creep evaluation (DMA850, TA Instruments Company).

[Measurement of the Time being Taken Until Reaching a Recovery Rate of 70% when a Tensile Stress is Applied at 70° C. at 2 MPa for 180 Seconds and then Removed]

After applying strain at 70° C. at 2 MPa for 180 seconds using dynamic mechanical analysis (DMA850, TA Instruments Company), the time required for the recovery rate to reach 70% was measured.

TABLE 1

| | PDI | Average diameter of pores (nm) | Maximum pore size (nm) | Strain rate (%) | Recovery time (sec) |
|---|---|---|---|---|---|
| Comparative Example 1 | 12.8 | 51.4 | 70.6 | 56.4 | 351 |
| Comparative Example 2 | 6.2 | 38.4 | 49.8 | 37.8 | 229 |
| Comparative Example 3 | 4.1 | 40.8 | 62.4 | 41.1 | 243 |
| Comparative Example 4 | 5.1 | 45.8 | 59.3 | 45.6 | 265 |
| Example 1 | 3.5 | 26.7 | 40.5 | 16.5 | 159 |
| Example 2 | 2.6 | 36.1 | 46.0 | 20.1 | 178 |
| Example 3 | 3.9 | 22.2 | 34.9 | 14.7 | 141 |

[Production of Electrode Assembly]

1) Preparation of a Cathode

A slurry for a cathode active material layer having a concentration of 50% by weight except for water was prepared by mixing a cathode active material ($LiNi_{0.8}Mn_{0.1}Co_{0.1}O_2$), a conductive material (carbon black), a dispersing agent (N-methylpyrrolidone, ADC-01, LG Chem), and a binder resin (a mixture of PVDF-HFP and PVDF) with water in a weight ratio of 97.5:0.7:0.14:1.66. Next, the slurry was coated on the surface of an aluminum thin film (thickness: 10 μm) and dried to prepare a cathode having a cathode active material layer (thickness: 120 μm).

2) Preparation of an Anode

A slurry for an anode active material layer having a concentration of 50% by weight except for water was prepared by mixing a graphite (natural graphite and artificial graphite blend), a conductive material (carbon black), a dispersing agent (polyvinylpyrrolidone, Japan Junsei Company), and a binder resin (a mixture of PVDF-HFP and PVDF) with water in a weight ratio of 97.5:0.7:0.14:1.66. Next, the slurry was coated on the surface of a thin copper film (thickness: 10 μm) and dried to prepare an anode having an anode active material layer (thickness: 120 μm).

3) Lamination Process

An electrode assembly was obtained by laminating the separators of Examples and Comparative Examples between the prepared anode and the cathode and performing a lamination process. The lamination process was performed at 70° C. at 5.2 MPa for 10 seconds using a hot press.

[Pore Size Reduction Rate]

The pore size reduction rate was calculated based on Formula 2 below.

pore size reduction rate (%)=(C−D/C)*100  (Formula 2)

In Formula 2, C is the average pore size of the separator substrate before the lamination process, and D is the average pore size of the separator substrate obtained after the lamination process.

[Resistance Measurement]

For a resistance, each separator substrate was interposed between SUS and an electrolyte was injected to prepare a coin cell, and the resistance (ER) was measured by the EIS method. At this time, the frequency was in the range of 100,000 Hz to 10,000 Hz. The electrolyte is a mixture of $LiPF_6$ at a concentration of 1M in a non-aqueous solvent in which ethylene carbonate and ethylmethyl carbonate are mixed in a ratio of 3:7.

[Dielectric Breakdown Voltage]

After hot press bonding the SUS mesh and separator substrate at a temperature of 90° C., 4 MPa, and is, a voltage that reaches the fail conditions (>0.5 mA, 3 s) by increasing the voltage to 100V/s was specified. For each Example and Comparative Example, the voltage of the lower 1% was derived through Weibull distribution analysis after measuring the dielectric breakdown voltage of 30 samples.

[Capacity Retention Rate]

For the prepared battery, charging and discharging were repeated in the range of 2.5 V to 4.25 V at a rate of 1 C, and a ratio of the discharge capacity after each cycle to the initial discharge capacity was derived by calculation. The capacity retention rate was evaluated at room temperature.

The results are shown in Table 2 below.

TABLE 2

| | Pore size Reduction rate (%) | Resistance (Ω) | Dielectric breakdown voltage (V) | Capacity retention rate (%) |
|---|---|---|---|---|
| Example 1 | 1.8 | 0.45 | 1615 | 89 |
| Example 2 | 4.9 | 0.43 | 1539 | 88 |
| Example 3 | 3.0 | 0.47 | 1752 | 91 |
| Comparative Example 1 | 17.3 | 0.34 | 1133 | 56 |
| Comparative Example 2 | 10.2 | 0.37 | 1368 | 62 |
| Comparative Example 3 | 9.0 | 0.36 | 1357 | 59 |
| Comparative Example 4 | 11.3 | 0.30 | 1243 | 57 |

What is claimed is:

1. A polyolefin separator for an electrochemical device, comprising:
 a polyolefin resin, having a polydispersity index (PDI) in a range of 3.5 to 3.9, and a weight-average molecular weight of 500,000 to 1,500,000,
 wherein the polyolefin separator comprises:
  a core part comprising a mixture of polyethylene and polypropylene, and
  a polyethylene skin part laminated on both sides of the core part,
 wherein the polyolefin separator comprises a plurality of pores,
 wherein the pores have an average pore size in a range of 22.2 nm to 36.1 nm and a maximum pore size of 34.9 nm or more and 46.0 nm or less,
 wherein the polyolefin separator has a strain rate of 14.7% or more and 20.1% or less as measured when a tensile stress is applied at 60° C. at 15 MPa for 60 seconds, and
 wherein the polyolefin separator has a recovery time of 141 seconds or more and 178 seconds or less to reach a recovery rate of 70% as measured after removing a tensile stress applied at 70° C. at 2 MPa for 180 seconds.

2. The polyolefin separator of claim 1, wherein the polyolefin resin has a weight-average molecular weight of 900,000.

3. The polyolefin separator of claim 1, wherein the polyolefin separator is manufactured by a wet manufacturing method wherein a pore-forming agent is extracted to form the pores.

4. An electrochemical device having an electrode assembly, the electrochemical device comprising a cathode, an anode, and the polyolefin separator of claim 1 interposed between the cathode and the anode.

5. The electrochemical device of claim 4, wherein the electrochemical device is a lithium secondary battery.

* * * * *